United States Patent Office 3,395,023
Patented July 30, 1968

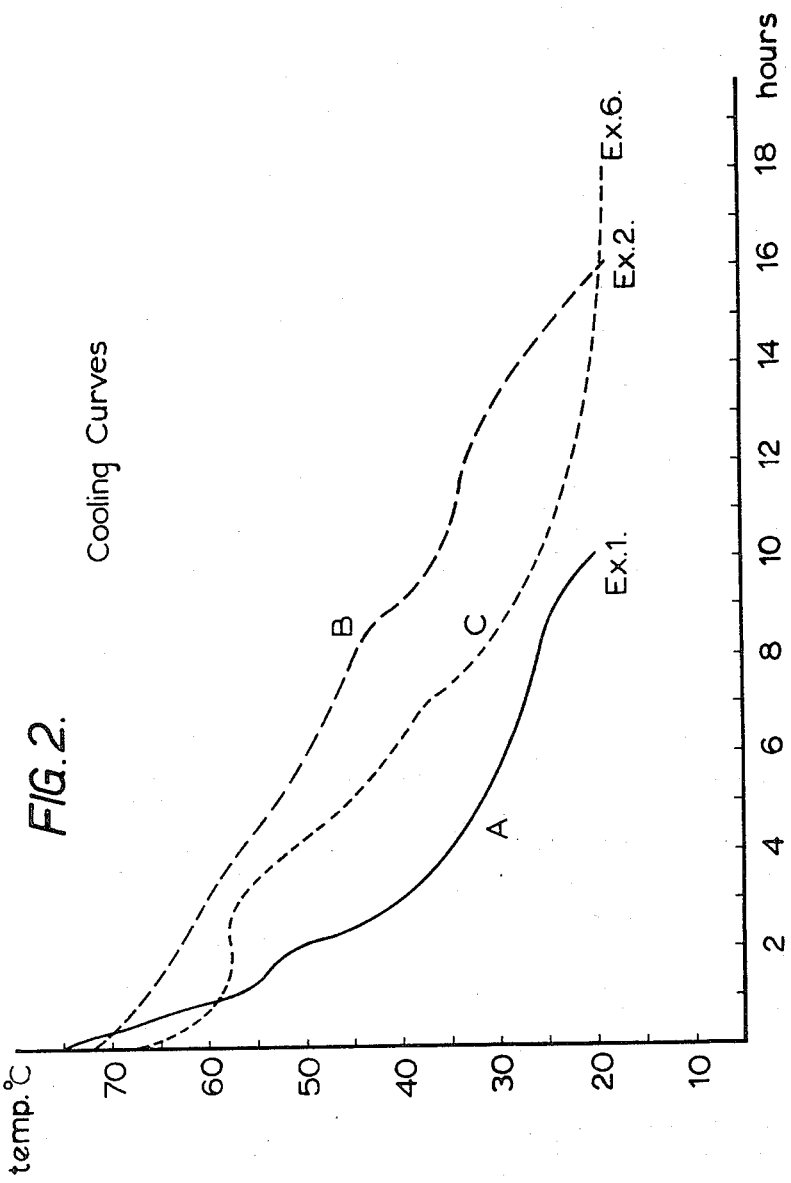

3,395,023
PREPARATION OF LIQUID SHORTENING
Adolf Johan Haighton, Vlaardingen, and Aart Mijnders, Ridderkerk, Netherlands, assignors to Lever Brothers Company, New York, N.Y., a corporation of Maine
Continuation-in-part of application Ser. No. 294,624, July 12, 1963. This application Mar. 20, 1967, Ser. No. 633,335
Claims priority, application Great Britain, July 16, 1962, 27,187/62
6 Claims. (Cl. 99—118)

ABSTRACT OF THE DISCLOSURE

According to the invention liquid shortenings are prepared by gradually cooling a mixture of fatty acid triglycerides having a solids content of 5 to 35% at 20° C. to form a slurry and rapidly comminuting this, for instance by passage through a colloid mill so that the maximum dimension of substantially all the solid particles is not greater than 15 microns.

---

Figure 1:
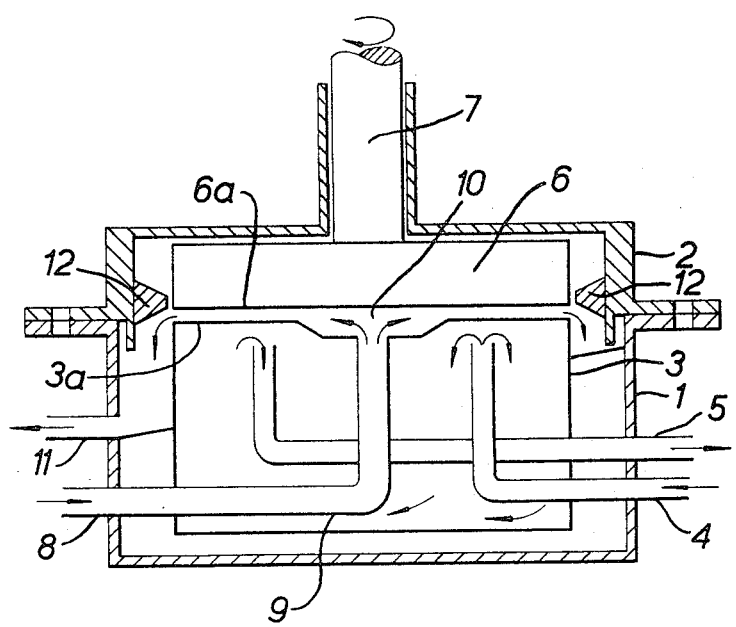

This application is a continuation-in-part of application Ser. No. 294,624, filed July 12, 1963.

This invention relates to fat compositions and especially to edible fat compositions suitable for use as shortenings, which have a fluid consistency over the normal range of room temperature, and are composed of suspensions of finely divided triglyceride crystals in liquid triglycerides.

Shortenings are usually prepared by blending liquid glyceride oils with normally solid triglycerides, which compositions after heating and by the application of suitable cooling procedures are converted to a non-fluid plastic consistency. There is a rising demand, however, for shortening compositions which have a fluid consistency so that they can be easily pumped, and measured by volume, rather than by weight, and mixed with the other constituents of pastry or cake doughs without undue labour. Such fluid shortenings will be composed essentially of suspensions of the normally solid fat particles in the normally liquid fat component. One requirement for a marketable product is that the solid particles be evenly distributed through the liquid phase and remain so for a long time without objectional settling out. However, when prepared by spontaneous cooling from the molten condition, such compositions tend to acquire a soupy or grainy semi-liquid consistency with the crystals of the solid fat forming comparatively large, loose clusters which settle to the bottom, leaving the clear oil at the top. Compare Brit. pat. spec. 660,610, page 1, lines 41–65, particularly lines 51–58.

Much research has been devoted to overcoming these problems and various methods have been proposed to manufacture fluid compositions in the form of stable homogeneous suspensions. It is an object of the present invention to provide a new method by which such products can be obtained.

Triglycerides are polymorphic, three crystal forms, known as the alpha, beta-prime and beta forms being generally recognised. The particular crystal form in which the solid phase in an oleaginous suspension will crystallize appears in some cases to have an important influence on the consistency of the composition. Thus, for instance, according to specification No. 660,610 referred to above, for preparing a stable suspension of a normally solid fatty triglyceride in a normally liquid fatty ester, it is important that the solid triglyceride should be present in the beta form. In this known process a transformation to the beta form of said solid triglyceride to an extent of at least 70% is required. According to the patent this has been achieved by an extremely sensitive and carefully carried out temperature control during cooling from elevated temperature or by tempering at a specific elevated temperature to convert crystals of other than the beta form into that form. A specific procedure of this known process involves cooling fairly quickly during agitation a completely liquid mixture of the normally solid triglyceride and liquid fatty ester to a temperature at which crystallisation begins, then cooling the mixture to 0 to 2° C. above the minimum beta crystallisation temperature. These temperatures cannot be stated positively, since they will depend on the proportion and kind of the solid triglyceride dissolved in the liquid, the minimum beta crystallisation temperature decreasing as crystallisation of solid triglyceride progresses. Thus it will be apparent that this process needs, besides an exact control of the temperature, preliminary determination of the temperature values which have to be employed in each specific case.

In another process the shortenings are first plasticized in the conventional manner, as by quickly running the hot liquid mixture through a chilled agitator unit, and then are passed to an agitating vessel where at room temperature the plastic mass is stirred for a period of several days. This process, simple as it may be, suffers from the considerable drawback which the duration of the agitation, which is stated as lying between 2 and 10 days, presents to an industrial manufacture.

We have now found that, if after cooling a suitable fat composition having a solids content as hereinafter defined of 5 to 35% of 20° C. gradually from the molten condition to a temperature within the range 10 to 30° C. and especially 18 to 25° C. the resulting slurry be passed continuously through comminuting means arranged to break crystal clusters and large crystals into extremely fine particles, so that substantially none of the solid particles in the effluent has a major dimension greater than 15 microns, then compositions suitable for use as liquid shortenings can be obtained even when the cooling is not controlled with a view to obtaining a major proportion of the crystals in the beta form. Thus we have obtained the desired results when the molten composition has been subjected to slow persistent cooling for instance by cooling surfaces maintained at a temperature within or below the ranges specified above, over the whole range between the initial and final temperatures without any interruption or control at any intermediate temperature as well as when the molten composition has been allowed to cool spontaneously, without the provision of specific heat-abstracting means, to the ambient temperature. Thus the cooling conditions may be such that a substantial proportion or a predominating proportion of the solid glycerides crystallises in other than beta form, for instance in beta-prime and/or alpha form and is still substantially or predominantly in other than beta form when fed to the comminuting means.

The compositions of the invention are composed substantially of a minor proportion of normally solid triglycerides and a major proportion of liquid triglycerides. At ordinary temperatures they are composed of fine crystals of triglycerides suspended in liquid triglycerides, the solids content at 20° C. being within the range 5 to 35% and preferably 10 to 20%. (The term "solids content" is used herein as synonymous with the "solid contents index" as defined in J. Am. Oil Chem. Soc., 34, 1957, pages 334 to 348.)

Preferably the temperature to which the composition is allowed to cool is the ambient temperature. It is particularly advantageous that the cooling should proceed until a temperature of between 18 and 25° C. is reached. The optimum temperature to which the composition should be cooled may vary within the range according to the particular composition treated. The exact temperature, however, is not essential for the process, but care should be taken that the consistency of the slurry is such that it can be fed into the comminuter.

It is desirable that the cooling proceeds rather slowly at a rate depending on the crystallisation properties of the fat mixture. 5 to 16 hours may be required when this step is performed in one of the conventional tanks provided with a stirrer and fitted with a cooling spiral. Good results, however, have also been obtained with cooling periods down to 2 to 3 hours when a continuous cooling device with a large specific cooling surface has been used. This device consists of a relatively long rectangular vessel equipped with longitudinally inserted cooling plates, the fatty mixture flowing slowly but continuously along these plates from one end of the vessel to the other. It has been possible to reduce the period of gradual cooling even further, for instance to half an hour or even less, by the use of suitable cooling apparatus provided with adequate stirring means.

The cooling should result in all the normally solid triglycerides present crystallising so that a slurry of interlacing crystals and crystal clusters is formed. These may be of varying size and crystal form. It is one advantage of the present process that no specific polymorphic crystal modification is required to predominate, although it has been observed that in many cases the beta prime form was the sole or predominant modification present.

As indicated above the slurry is continuously fed through comminuting means arranged to break crystal clusters and large crystals into extremely fine particles, substantially none of the particles in the effluent having a major dimension exceeding 15 microns. The major dimension of the particles is 15 microns but is preferably considerably less, for instance less than 10, or better less than 5 microns. The comminuting means should be such that almost all the solid particles, for instance 80 to 90 or 95% or more of their weight are extremely fine. The comminuter may be cooled to counteract any substantial rise of temperature due to friction.

Though the process of the present invention is not bound up with the use of any particular kind of comminuter as long as it can fulfil the required task, it is preferred to use an apparatus of the kind described below with reference to the accompanying drawing.

Referring to FIGURE 1 of the drawings, in a housing 1 having a pressure tight cover 2 is mounted a hollow stator 3 having a working surface 3a and provided with inlet means 4 and outlet means 5 for a cooling medium. Above the stator a rotor 6 having a working surface 6a is mounted on a shaft 7. Means not shown are provided for rotating the shaft 7 at speeds ranging from 1000 to 5000 r.p.m. Means not shown, are also provided for axial adjustment of the shaft 7 so as to be able to vary the clearance between the surfaces 3a and 6a within the range 20 to 100 microns.

Inlet means 8 are provided for feeding the composition to be comminuted through a passage 9 in the stator to the space 10 between the surfaces 3a and 6a and outlet means 11 are provided for the comminuted composition. Baffles 12 serve to divert the composition away from the sides of the rotor.

In operation, with the rotor adjusted to provide the desired clearance between the working surfaces of rotor and stator, and driven at a high speed, and a cooling liquid circulating through the stator, the composition is pumped to the inlet 8 whence it passes along the passage 9 to the space 10. Thence it flows radially outwards between the surfaces 3a and 6a (the large particles being ground between these surfaces to extremely fine particles), to the annular space between the stator and the housing and issues in the comminuted condition through the outlet 11.

The higher the speed the greater may be the clearance between the grinding surfaces and at very high speeds a gap even greater than 50 microns may give useful results. Good results have been obtained with a gap of 20 to 30 microns and a rotation speed of 1400 to 2000 r.p.m. To prevent any substantial rise in temperature of the shortening treated, it has generally been necessary to employ a cooling medium having a temperature at least as low as 3° C.

After passing the comminuter the composition is collected as a fluid substantially homogeneous suspension of the solid fat particles in the liquid fat, which will remain for some time fluid and homogeneous without settling out of the solid particles when stored at ambient temperature. The composition obtained has a relatively low viscosity which makes it readily pourable from bottles with comparatively small outlets. It is also distinguished by its good baking properties.

The following examples, in which all the parts are by weight and in which the melting points referred to are slip-melting points, illustrate the invention.

Example 1

A fat mixture consisting of:

| | Parts |
|---|---|
| Hardened palm oil (I.V. less than 15) | 7.5 |
| Coconut oil | 20 |
| Hardened whale oil (M.P. 36-38° C.) | 10 |
| Groundnut oil | 62.5 | was heated to 75° C. and then pumped into a cooling tank where, while being stirred, it was cooled to 20° C. within 10 hours. The cooling medium running through the spirals of the tank was tap-water having a temperature of 10° C. The course of the cooling is graphically shown in FIG. 2 by curve A.

The resulting slurry was pumped to a comminuter of the construction described above which was cooled with a cooling medium of 2° C. The speed of the rotor was 1400 r.p.m. and the gap between the grinding surfaces was 20 microns. The fat left the comminuter at a temperature of 22° C. The resulting fluid homogeneous suspension with a solids content of 10% at 20° C. was tested after 3 weeks' storage at room temperature (18-23° C.); it still was homogeneous, pumpable and even pourable.

Example 2

A fat mixture consisting of:

| | Parts |
|---|---|
| Hardened palm oil (I.V. less than 15) | 5 |
| Palm oil | 30 |
| Coconut oil | 20 |
| Soyabean oil | 45 | was heated to 72° C. and then cooled within 15 hours as described in Example 1, but without stirring, to 19° C. The course of the cooling is graphically shown in FIG. 2 by curve B. After stirring the subsequent mechanical treatment was performed according to Example 1, except that the distance between the grinding surfaces was 30 microns and the rotation speed 2000 r.p.m.; the fat left the comminuter at a temperature of 20.5° C.

The resulting fluid homogeneous suspension with a solids content of 10% at 20° C. was tested after standing for two weeks at room temperature. It had remained homogeneous and pumpable.

Example 3

A fat mixture consisting of:

| | Parts |
|---|---|
| Hardened groundnut oil (I.V. less than 15) | 5 |
| Beef tallow | 10 |
| Coconut oil | 20 |
| Hardened fish oil (M.P. 36-38° C.) | 10 |
| Groundnut oil | 55 | was heated to 87° C. and then cooled without stirring, in the cooling tank with cooling water at 8° C. to 18.5° C. within 15 hours.

After stirring followed by mechanical treatment according to Example 1, but with a distance between the grinding surfaces of 10 microns, the fat left the comminuter at a temperature of 22° C. After two weeks' storage at 20° C. the fluid homogeneous suspension was tested. The solid phase (solids content 13% at 20° C.), was in the form of beta-prime crystals substantially all the particles having a major dimension not greater than 7 microns. Substantially no change in fluidity occurred during storage.

Example 4

A fat mixture consisting of:

| | Parts |
|---|---|
| Hardened palm oil (I.V. less than 15) | 10 |
| Beef tallow | 10 |
| Coconut oil | 20 |
| Partly hardened soyabean oil (I.V. 95) | 60 | was heated to 82° C. and then cooled in a continuous cooling device as described earlier within 3 hours to 20° C. The cooling medium in the comminuter had a temperature of 0° C. and no rise in temperature of the fat composition was observed after mechanical treatment, which was carried out as in Example 1, except that the distance between the grinding surfaces was 50 microns. The homogeneous suspension, having a solids content of 19% at 20° C. was also after four weeks' storage, still pumpable.

Example 5

A fat mixture consisting of:

| | Parts |
|---|---|
| Hardened cottonseed oil (I.V. 20) | 10 |
| Hardened whale oil (M.P. 36–38° C.) | 10 |
| Coconut oil | 20 |
| Cottonseed oil | 60 | was heated to 95° C. and then cooled within 4 hours to 18° C. as described in Example 4. The cooling medium in the comminuter had a temperature of 3° C. and during treatment in the comminuter with a distance between the grinding surfaces of 40 microns and a rotation speed of 2000 r.p.m. the temperature of the fat composition rose to 21° C. The resulting homogeneous shortening having a solids content of 15% at 20° C. was, also after three weeks' storage at 20° C., pumpable and even pourable.

Example 6

A fat mixture consisting of:

| | Percent |
|---|---|
| Partly hardened soyabean oil (I.V. 95) | 60 |
| Beef tallow | 10 |
| Coconut oil | 20 |
| Totally hardened palm oil (M.P. 58° C.) | 10 | was melted in a kettle at 60° C. and while being stirred was allowed to cool over-night to room temperature (18.5° C.). The course of the cooling is graphically shown in FIG. 2 by curve C. The resulting pumpable mass consisting of large crystal clusters in oil was then pumped into the comminuter and treated as in Example 1, except that the cooling medium had a temperature of −6° C. The fat left the comminuter at a temperature of 17.5° C.

The resulting, homogeneous shortening remained pumpable for at least two weeks when stored at 20° C. The solid phase in the shortening at 20° C. amounted to 16% and consisted entirely of crystals of beta-prime form substantially all of which had a major dimension not greater than 5 microns.

Although in the preceeding examples most samples were tested after being stored for 2 to 4 weeks, this does not imply that the stability of the homogeneous suspensions is limited to that period, some having been kept meanwhile for more than 6 months without change.

What is claimed is:

1. Process for preparing a liquid shortening, wherein a fat mixture composed substantially of fatty acid trigylcerides and having a solids content at 20° C. of 5 to 35% is converted from the molten condition to a slurry having a temperature within the range 10 to 30° C. by subjecting the mixture to gradual cooling during a period of 30 minutes to 16 hours, and the slurry is then rapidly comminuted to the extent that substantially none of the solid particles in the comminuted product has a major dimension exceeding 15 microns, the comminution being effected by passing the slurry through the space between cooled co-axial working surfaces of which one is rotated at high speed relative to the other, said surfaces being 10 to 50 microns apart.

2. Process according to claim 1, wherein the gradual cooling of the molten mixture extends over a period of at least two hours.

3. Process according to claim 1, wherein the slurry is composed largely of clusters of triglyceride crystals, substantially all such crystals being of other than the beta crystal form, said clusters being suspended in liquid triglyceride.

4. Process according to claim 1, wherein the cooling is effected at a relatively constant rate in a period of 3 to 16 hours and the final temperature of the slurry is within the range 18 to 25° C.

5. Process according to claim 1, wherein the major dimension of substantially all the solid particles emerging from the comminuting means is not greater than five microns.

6. Process according to claim 1, wherein comminution is effected by passing the slurry between cooled circular coaxial working surfaces which surfaces are 10 to 50 microns apart, one of them rotating relatively to the other at a high speed, and the slurry is fed to the central region of the space between them and travels radially outwards therefrom to a collecting point from which it flows away.

References Cited

UNITED STATES PATENTS

| 2,846,312 | 8/1958 | Lantz et al. | 99—118 |
| 2,999,755 | 9/1961 | Handschumaker et al. | 99—118 |

MAURICE W. GREENSTEIN, *Primary Examiner.*